US011816762B2

(12) United States Patent
Cong et al.

(10) Patent No.: US 11,816,762 B2
(45) Date of Patent: Nov. 14, 2023

(54) THREE-DIMENSIONAL RECONSTRUCTION METHOD BASED ON HALF-PEAK PROBABILITY DENSITY DISTRIBUTION

(71) Applicant: Zhejiang University, Zhejiang (CN)

(72) Inventors: Feiyun Cong, Zhejiang (CN); Huimin Li, Zhejiang (CN); Shuiguang Tong, Zhejiang (CN)

(73) Assignee: Zhejiang University, Hangzhou (CN)

( * ) Notice: Subject to any disclaimer, the term of this patent is extended or adjusted under 35 U.S.C. 154(b) by 763 days.

(21) Appl. No.: 16/939,054

(22) Filed: Jul. 26, 2020

(65) Prior Publication Data

US 2020/0380738 A1 Dec. 3, 2020

Related U.S. Application Data

(63) Continuation of application No. PCT/CN2019/122016, filed on Nov. 29, 2019.

(30) Foreign Application Priority Data

May 27, 2019 (CN) .......................... 201910446247.9

(51) Int. Cl.
*G06T 11/00* (2006.01)
*G06T 17/20* (2006.01)
(52) U.S. Cl.
CPC ............ *G06T 11/005* (2013.01); *G06T 17/20* (2013.01)

(58) Field of Classification Search
None
See application file for complete search history.

(56) References Cited

U.S. PATENT DOCUMENTS 9,370,333 B2 * 6/2016 Nagler ..................... A61B 6/06
2019/0154872 A1 * 5/2019 Leduc ..................... H04N 23/90

FOREIGN PATENT DOCUMENTS

CN            104318622 A  *  1/2015  ............. G06T 17/30

* cited by examiner

*Primary Examiner* — Dov Popovici

(57) ABSTRACT

A three-dimensional reconstruction method based on half-peak probability density distribution, including: slicing three-dimensional point cloud along Z-axis direction to obtain N spatial layers; extracting the scatter information in i-th spatial layer and projecting information to $Z_i$ plane; constructing membership function of each grid and scatter in the $Z_i$ plane and drawing a three-dimensional probability density plot; making a plane parallel to XOY plane through half-peak $w_{max/2}$ of three-dimensional probability density plot, parallel intersecting a three-dimensional probability density plot to obtain a contour $L_{XY}$; superimposing radioactive source reconstruction contours corresponding to N spatial layers sequentially to obtain a three-dimensional reconstruction model of a radioactive source. The method can be applied to the nuclear electrical field, to achieve the rapid reconstruction of radioactive sources after nuclear accidents and accurate contour reconstruction after decommissioning of radioactive sources.

5 Claims, 6 Drawing Sheets

THREE-DIMENSIONAL RECONSTRUCTION METHOD BASED ON HALF-PEAK PROBABILITY DENSITY DISTRIBUTION

CROSS REFERENCE TO RELATED APPLICATIONS

The present application is a Continuation Application of PCT Application No. PCT/CN2019/122016 filed on Nov. 29, 2019, which claims the benefit of Chinese Patent Application No. 201910446247.9 filed on May 27, 2019. All the above are hereby incorporated by reference in their entirety.

FIELD OF THE INVENTION

The present invention relates to a general technical field of signal processing, especially relates to a three-dimensional reconstruction method based on half-peak probability density distribution.

BACKGROUND OF THE INVENTION

Nuclear energy has become the third largest energy source in the world, with the increasing nuclear accidents, nuclear safety has become a major issue that needs to be resolved urgently.

Every nuclear accident will bring great casualties and economic losses. Currently, there are two major needs in the nuclear electrical field: firstly, to find the radioactive sources as soon as possible after an accident and deal with them. Due to the unscientific nuclear emergency plan and untimely treatment of radioactive sources, a large amount of nuclear waste water from the Fukushima nuclear accident flows into the Pacific Ocean, and radioactive substances are transmitted to some countries in East Asia through the atmosphere, which has caused great impact on the earth's ecological environment and the social stability of the relevant countries. Secondly, to detect the radioactive sources in the decommissioning of used nuclear facilities. The decommissioning of nuclear facilities is a rigorous and complex system engineering, which involves the investigation of source term, decontamination, disassembly and waste treatment and disposal of a series of strong radiation sites and highly radioactive contaminated components. It has become a major difficulty for the decommissioning of these nuclear facilities to quickly achieve the detection of the position of waste radioactive sources and contour reconstruction.

Presently, studies on radioactive source detection and reconstruction technology are very hot in the world. Since the Fukushima disaster, Japanese government has organized universities, enterprises, and research institutes led by the University of Tokyo to carry out research on nuclear safety and robot integration technology. The European Organization for Nuclear Research has developed Monte Carlo application software package Geant4 (Geometry and Tracking) based on C++ object-oriented technology. Many researchers have conducted researches on the related fields such as radioactive sources, high-energy particle analysis using this software and have achieved many achievements.

In china, most studies focus on medical image reconstruction, outdoor radioactive source positioning, etc. There are few studies on radioactive source three-dimensional imaging and online rapid identification and diagnosis. Most of studies on point cloud three-dimensional reconstruction technology focus on reverse engineering of parts, scanning of ancient buildings and medical imaging, but there is no application of this technology in the nuclear electrical field.

SUMMARY

In order to overcome the defects of the prior art, the present invention provides a three-dimensional reconstruction method based on half-peak probability density distribution.

To achieve the aforesaid object, the present invention adopts the following technical solutions:

A three-dimensional reconstruction method based on half-peak probability density distribution, comprising the following steps:

(1) Slicing three-dimensional point cloud along the Z-axis direction to obtain N spatial layers;

(2) Extracting the scatter information in the i-th spatial layer and projecting the information to the Zi plane;

(3) Constructing the membership function of each grid and scatter in the $Z_i$ plane and drawing a three-dimensional probability density plot;

(4) Making a plane parallel to the XOY plane through the half-peak $w_{max/2}$ of the three-dimensional probability density plot, the parallel intersecting the three-dimensional probability density plot to obtain a contour $L_{XY}$, and the contour $L_{XY}$ being a radioactive source reconstruction contour corresponding to the i-th spatial layer;

(5) Superimposing radioactive source reconstruction contours corresponding to N spatial layers sequentially to obtain a three-dimensional reconstruction model of the radioactive source.

Further, the specific process of step (1): performing three-dimensional voxel segmentation modeling in the imaging area, defining the search space as a space rectangular coordinate system, and conducting statistics of the maximum value Zmax and minimum value Zmin on the Z-axis coordinates of the point cloud data, letting $$N = [n] + 1, n = \frac{Zmax - Zmin}{m1}$$

Where [ ] is a rounding function, m1 is the thickness of each spatial layer, and N is the number of spatial layer layers after the space is cut;

Taking m1 as the thickness of each spatial layer, the three-dimensional point cloud is divided in a plane parallel to XOY along the Z-axis direction, to obtain N spatial layers, and the plane dividing the three-dimensional point cloud along the Z-axis direction is defined as $Z_1, Z_2 \ldots Z_{N+1}$.

Further, the specific process of step (2): judging the three-dimensional point cloud data and assigning values, and setting the coordinate of any point P in the point cloud as $(x_p, y_p, z_p)$, and $z_p$ satisfying:

$$z_i \leq z_p < z_{i+1}$$

It can be known that the P point is in the i-th spatial layer, that is, the space between the $Z_i$ and $Z_{i+1}$ planes, including the $Z_i$ plane, but excluding the $Z_{i+1}$ plane;

Projecting the point from this space to the lower plane where the space is located, that is, the $Z_i$ plane, letting $$z_p = z_i$$

then the coordinate $(x_p, y_p, z_p)$ of point P is transformed into $P'(x_p, y_p, z_i)$; all coordinates of the point cloud data are traversed, and all point cloud data are projected onto the corresponding plane in sequence.

Further, the specific process of step (3): taking the projection plane $Z_i$ as an example, simplifying the coordinate $P'(x_p, y_p, z_i)$ of all projection points in the $Z_i$ plane to plane coordinate $P''(x_p, y_p)$, conducting statistics of the maximum value $X_{max}$ and minimum value $X_{min}$ on the X-axis coordinates, and the maximum value $Y_{max}$ and the minimum value $Y_{min}$ on the Y-axis coordinates; letting $$E = [e] + 1, e = \frac{X\max - X\min}{m2}$$

$$F = [f] + 1, f = \frac{Y\max - Y\min}{m2}$$

Where, [ ] is a rounding function, m2 is the grid step size, E is the number of columns of the $Z_i$ plane data divided equally in the X axis direction, and F is the number of rows of the $Z_i$ plane data divided equally in the Y axis direction;

At this time, the $Z_i$ plane is divided into E*F grids with a side length of m2; the plane data are mapped into a two-dimensional matrix of F*E, and the initial values of matrix elements $a_{11}, a_{12} \ldots a_{jk} \ldots a_{FE}$ are all zero, if the point cloud data coordinate is:

$$\begin{cases} x_j \le x_p < x_{j+1} \\ y_k \le y_p < y_{k+1} \end{cases}$$

then $a_{jk}=a_{jk+1}$, all points in the $Z_i$ plane are traversed to obtain the matrix $A_{FE}$, the matrix element value expresses the membership relationship between the point cloud data and the position, statistical reconstruction of the three-dimensional probability density distribution is performed for aggregation and distribution of points on the Zi plane to obtain a three-dimensional intensity plot, that is, a three-dimensional probability density plot.

Further, the specific process of step (4): obtaining the peak $w_{max}$ from the three-dimensional probability density plot and the half peak $w_{max/2}$, making a plane parallel to the XOY plane through the half-peak $w_{max/2}$, the parallel intersecting the three-dimensional probability density plot to obtain a contour $L_{XY}$, and expressing this relationship as follows:

$$L_{XY} = \begin{cases} SLC(X, Y) = G(X, Y, Z) \\ W_{max/2} = 1/2\max(G(X, Y, Z) \to Z) \end{cases}$$

Where, SLC(X,Y) represents the slice plane at the peak point, G(X,Y,Z) represents the three-dimensional probability density plot, and $W_{max/2}$ represents the half-height probability density plane.

The present invention can achieve the following beneficial effects:

(1) The method of the present invention can be applied to the nuclear electrical field, to achieve the rapid reconstruction of radioactive sources after nuclear accidents and accurate contour reconstruction after decommissioning of radioactive sources.

(2) The point cloud is accurately reconstructed by the half-peak probability density distribution method in the present invention, to obtain the identification shape of the radioactive source in each direction.

(3) The present invention can obtain evaluation indexes of reconstructed three-dimensional images from multiple directions.

(4) The Compton camera is mounted on a mobile robot to acquire a large amount of data. Compared with the ordinary radioactive source reconstruction method, the present invention can achieve more comprehensive sampling of point cloud data.

DETAILED DESCRIPTION

The technical solutions of the present invention will be further described in detail below in conjunction with the drawings. It should be noted that the specific embodiments are only detailed descriptions of the present invention and should not be regarded as limiting the present invention.

Figure 1:
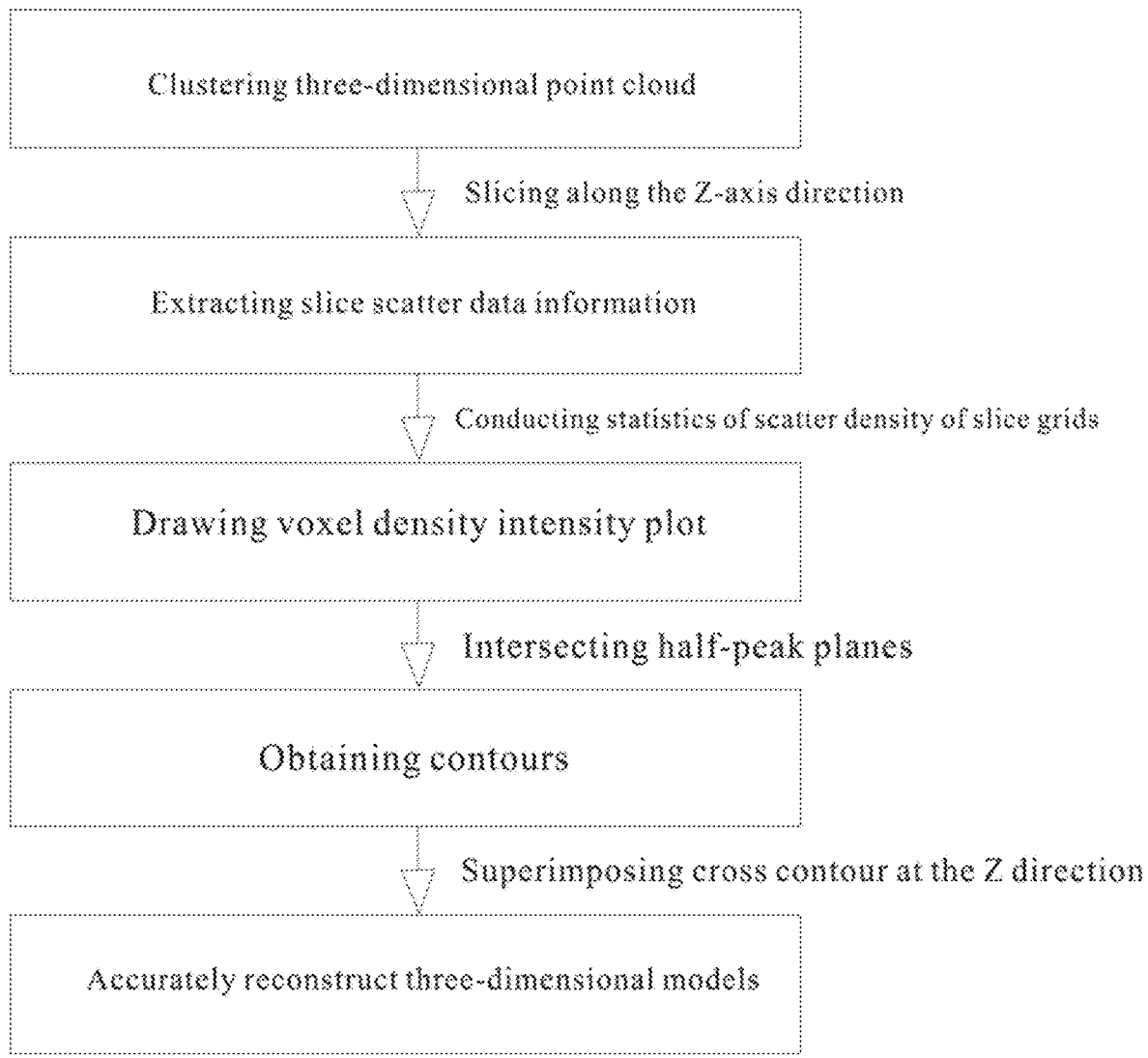
FIG. 1 is a schematic diagram of a three-dimensional reconstruction method based on half-peak probability density distribution.

The present invention provides a three-dimensional reconstruction method based on half-peak probability density distribution as shown in FIG. 1, comprising the following steps:

(1) Slicing three-dimensional point cloud along the Z-axis direction to obtain N spatial layers;

(2) Extracting the scatter information in the i-th spatial layer and projecting the information to the Zi plane;

(3) Constructing the membership function of each grid and scatter in the $Z_i$ plane and drawing a three-dimensional probability density plot;

(4) Making a plane parallel to the XOY plane through the half-peak $w_{max/2}$ of the three-dimensional probability density plot, the parallel intersecting the three-dimensional probability density plot to obtain a contour $L_{XY}$, and the contour $L_{XY}$ being a radioactive source reconstruction contour corresponding to the i-th spatial layer;

Similarly, repeating the steps (2) to (4) to obtain the radioactive source reconstruction contours corresponding to other spatial layers;

(5) Superimposing radioactive source reconstruction contours corresponding to N spatial layers sequentially to obtain a three-dimensional reconstruction model of the radioactive source.

In some preferred embodiments, the three-dimensional point cloud information of the radioactive source is acquired by the Compton imaging robot; The Compton imaging robot consists of a Compton camera, a gamma ray detector and a mobile robot; the mobile robot has a positioning system, the Compton camera is mounted on the mobile robot, and the gamma ray detector is a part of the Compton camera. The Compton camera is used to obtain the position information of the radioactive source; the Compton imaging robot can be used to realize multi-angle multi-point measurement of the radioactive source. By using the Compton imaging robot, Compton scattering information from different positions can be obtained.

In some preferred embodiments, the gamma ray detector can track the input energy $E_0$, wavelength $\lambda_0$ and scattering energy $E_1$, wavelength $\lambda_1$ of the radioactive source, since the relationship between energy and scattering angle is expressed as $$\cos\theta = 1 - m_e c^2 \left[\frac{1}{E_1} - \frac{1}{E_0}\right],$$

where, $m_e$ and c are the mass of the electron and the speed of light, respectively, the scattering angle $\theta$ can be obtained;

When Compton scattering occurs, the position of scattering and absorption is recorded, x represents the scattering position, y represents the absorption position; the radioactive source points are distributed on the surface of the cone with x as the vertex, then the direction of the central axis of the cone is w:

$$w = x - y$$

For each Compton scattering process, a cone can be obtained. If two gamma rays emitted from the same point have Compton scattering effect, the two corresponding cones will intersect at the source point, and the intersection point is the radioactive source point to be selected. In actual situations, the radioactive source is often not a point but a three-dimensional space with certain size and shape. The Compton scattering occurring around different positions of the radioactive source will generate multiple radioactive source points, which will aggregate into the three-dimensional point cloud data of the radioactive source.

Figure 2:
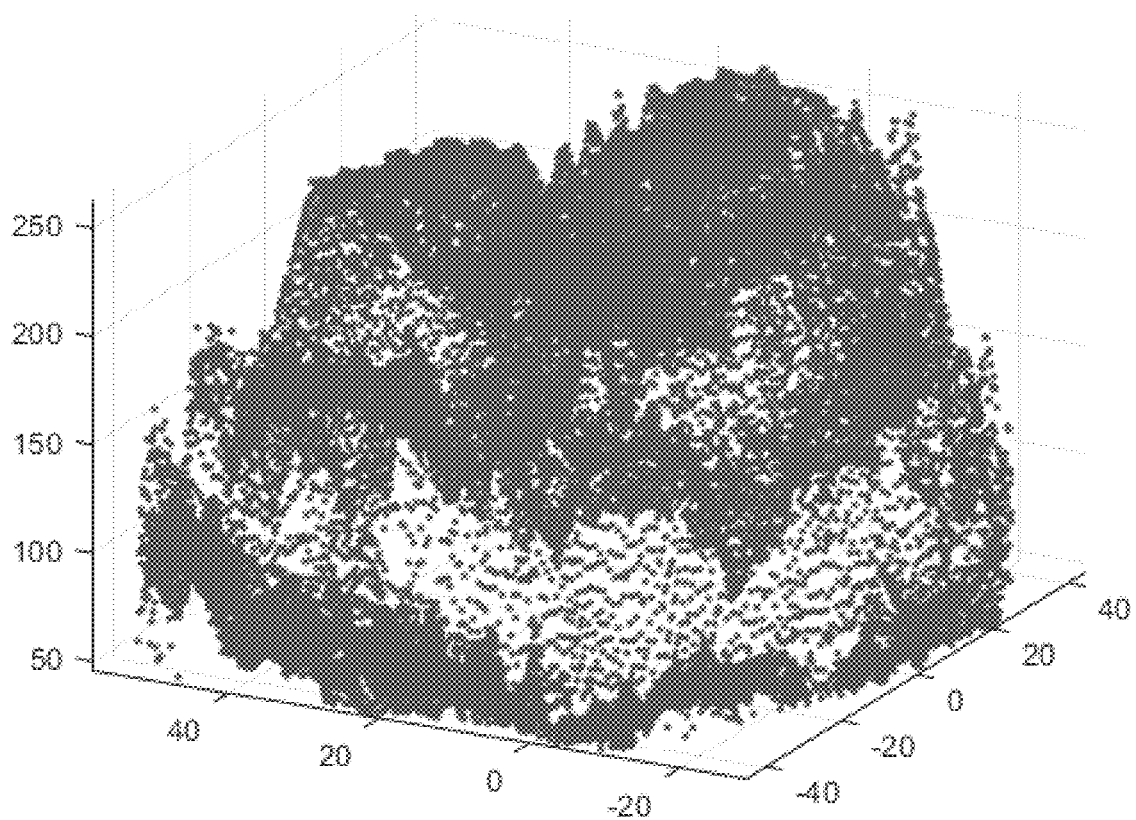
FIG. 2 is a sampling point cloud image.

In some preferred embodiments, in the step (1), the three-dimensional point cloud refers to part of the point cloud information collected by the gamma ray detector, as shown in FIG. 2, which is not complete; in fact, the acquisition of point cloud is a dynamic process. After acquiring the three-dimensional point cloud, the three-dimensional reconstruction of the radioactive source is carried out through the steps of this method. The reconstructed radioactive source information is the target point of movement for the mobile robot. As the mobile robot approaches the target point, it will continuously collect and update point cloud information, and at the same time, the three-dimensional reconstruction model of radioactive source is updated.

Figure 3:
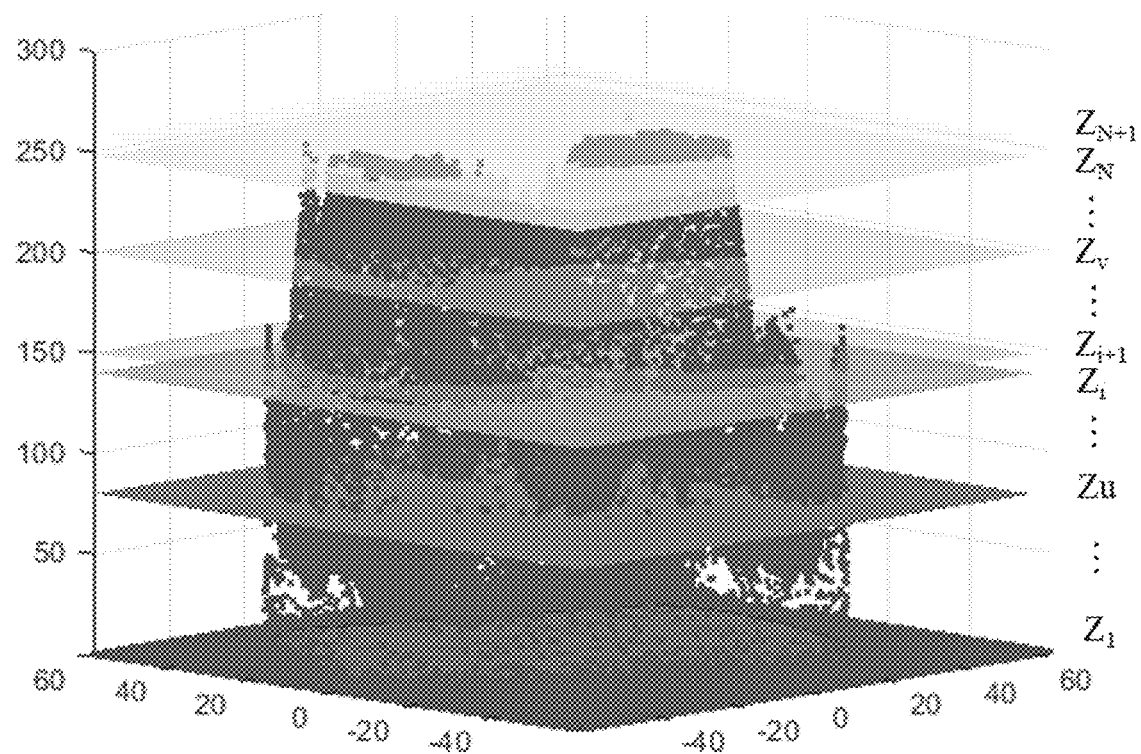
FIG. 3 is a schematic diagram of the structure of slicing the sampling point cloud along the Z-axis direction.
Figure 4:
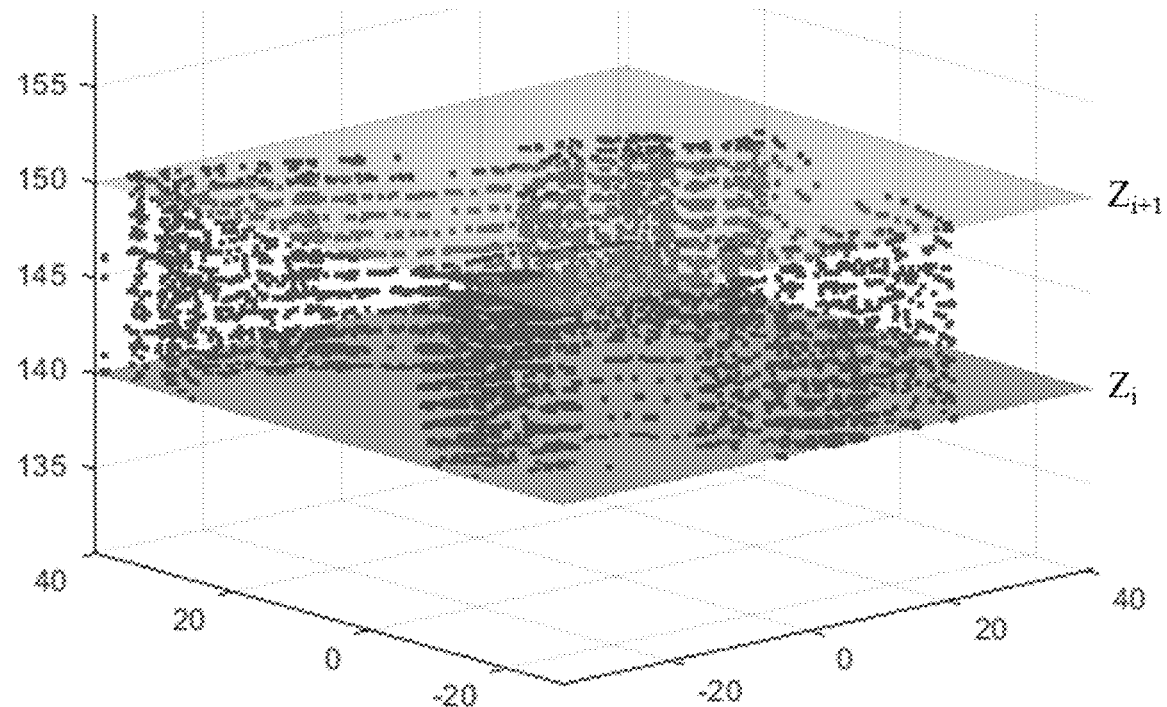
FIG. 4 is a point cloud image in the i-th spatial layer.

In some preferred embodiments, in the step (1), the specific process of slicing three-dimensional point cloud along the Z-axis direction is as follows: performing three-dimensional voxel segmentation modeling in the imaging area, defining the search space as a space rectangular coordinate system, and conducting statistics of the maximum value $Z_{max}$ and minimum value $Z_{min}$ on the Z-axis coordinates of the three-dimensional point cloud data, letting $$N = [n] + 1, n = \frac{Z\max - Z\min}{m1}$$

Where [ ] is a rounding function, m1 is the thickness of each spatial layer, and N is the number of spatial layer layers after the space is cut;

Taking m1 as the thickness of each spatial layer, the three-dimensional point cloud is divided in a plane parallel to XOY along the Z-axis direction; when limiting the thickness m1 of each spatial layer to be consistent for reconstruction, the accuracy is adjusted. The smaller the m1, the higher the accuracy, and the smoother the reconstructed three-dimensional model. While ensuring the accuracy, the larger the m1, the faster the calculation efficiency, and only one value needs to be modified when adjusting the parameters for setting of consistent thickness, which is convenient;

At this time, the search space is divided into N spatial layers along the Z-axis direction, and the plane dividing the space is defined as $Z_1, Z_2 \ldots Z_{N+1}$ along the Z-axis direction, as shown in FIG. 3; the point cloud information in the i-th spatial layer is shown in FIG. 4. The i-th spatial layer is the space between the $Z_i$ and $Z_{i+1}$ planes, including the $Z_i$ plane, but not including $Z_{i+1}$ plane.

In some preferred embodiments, in the step (2), the scatter information in the i-th spatial layer refers to three-dimensional point cloud data information in the i-th spatial layer.

In some preferred embodiments, in the step (2), the specific process of extracting the scatter information in the i-th spatial layer and projecting the information to the Zi plane is as follows:

judging the three-dimensional point cloud data and assigning values, and setting the coordinate of any point P in the point cloud as $(x_p, y_p, z_p)$, and $z_p$ satisfying:

$$z_i \leq z_p < z_{i+1}$$

It can be known that the P point is in the i-th spatial layer, that is, the space between the $Z_i$ and $Z_{i+1}$ planes, including the $Z_i$ plane, but excluding the $Z_{i+1}$ plane; Projecting the point from this space to the lower plane where the space is located, that is, the $Z_i$ plane, letting $$z_p = z_i$$

then the coordinate $(x_p, y_p, z_p)$ of point P is transformed into $P'(x_p, y_p, z_i)$; all coordinates of the point cloud data are traversed, and all point cloud data are projected onto the corresponding plane in sequence.

In some preferred embodiments, in the step (3), the specific process of constructing the membership function of each grid and scatter in the $Z_i$ plane is as follows: taking the projection plane $Z_i$ as an example, simplifying the coordinate $P'(x_p, y_p, z_i)$ of all projection points in the $Z_i$ plane to plane coordinate $P''(x_p, y_p)$, conducting statistics of the maximum value $X_{max}$ and minimum value $X_{min}$ on the X-axis coordinates, and the maximum value $Y_{max}$ and the minimum value $Y_{min}$ on the Y-axis coordinates; letting $$E = [e] + 1, e = \frac{X\max - X\min}{m2}$$

$$F = [f] + 1, f = \frac{Y\max - Y\min}{m2}$$

Figure 5:
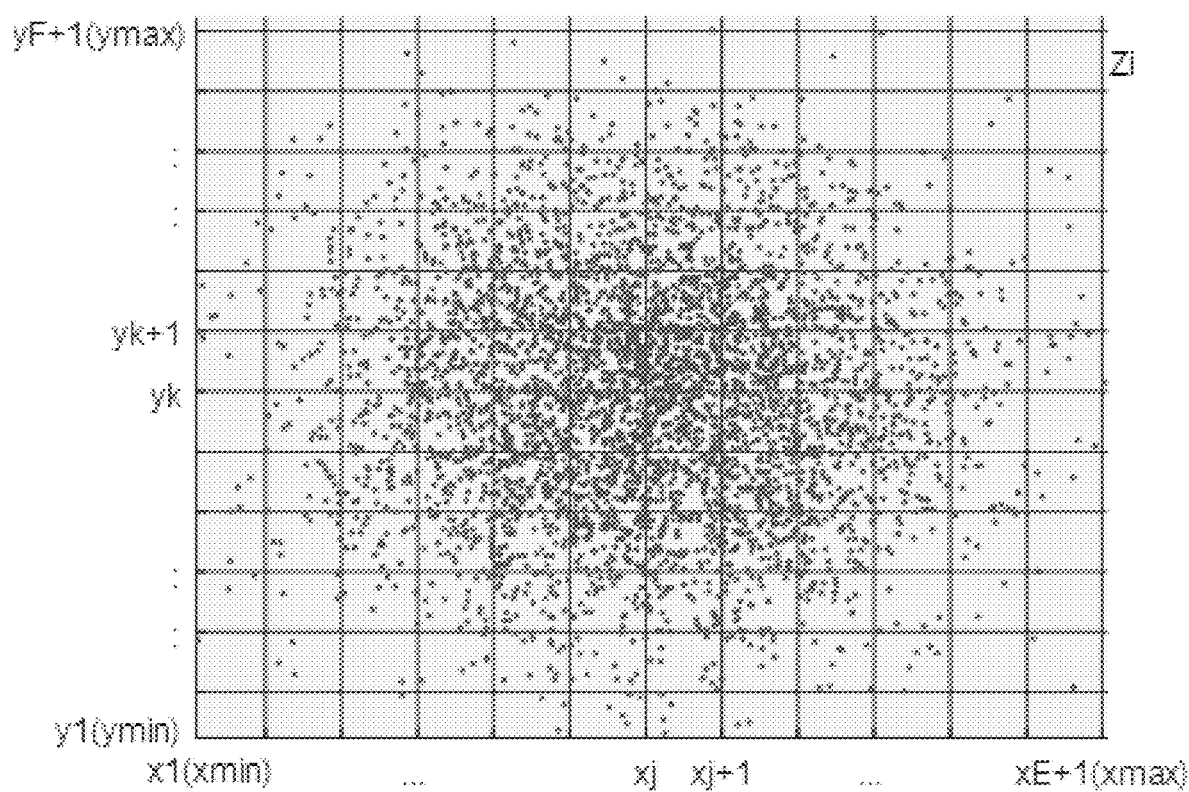
FIG. 5 is a schematic diagram of projecting a point cloud in the i-th spatial layer onto the $Z_i$ plane.

Where, [ ] is a rounding function, m2 is the grid step size, E is the number of columns of the $Z_i$ plane data divided equally in the X axis direction, and F is the number of rows of the $Z_i$ plane data divided equally in the Y axis direction;

At this time, the $Z_i$ plane is divided into E*F grids with a side length of m2, as shown in FIG. 5; the plane data are mapped into a two-dimensional matrix of F*E, and the initial values of matrix elements $a_{11}, a_{12} \ldots a_{jk} \ldots a_{FE}$ are all zero, if the point cloud data coordinate is:

$$\begin{cases} x_j \leq x_p < x_{j+1} \\ y_k \leq y_p < y_{k+1} \end{cases}$$

then $a_{jk}=a_{jk}+1$, where, j is any coordinate point in the X-axis direction, k is any coordinate point in the Y-axis direction, as shown in FIG. 5;

all points in the $Z_i$ plane are traversed to obtain the matrix $A_{FE}$, the matrix element value expresses the membership relationship between the point cloud data and the position, and the position refers to the corresponding row and column value of the element. Statistical reconstruction of the three-dimensional probability density distribution is performed for aggregation and distribution of points on the Zi plane to obtain a three-dimensional intensity plot, that is, a three-dimensional probability density plot, as shown in FIG. 6.

Figure 6:
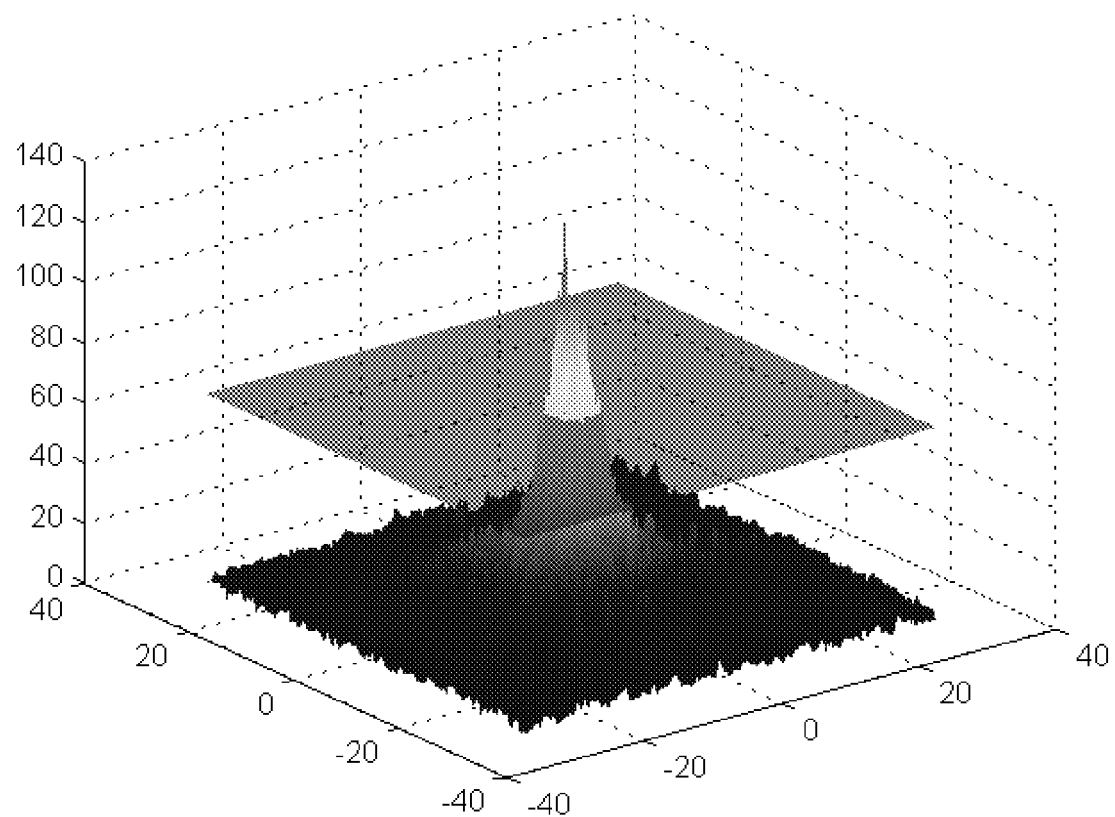
FIG. 6 is a three-dimensional probability density plot constructed by the i-th spatial layer.
Figure 7:
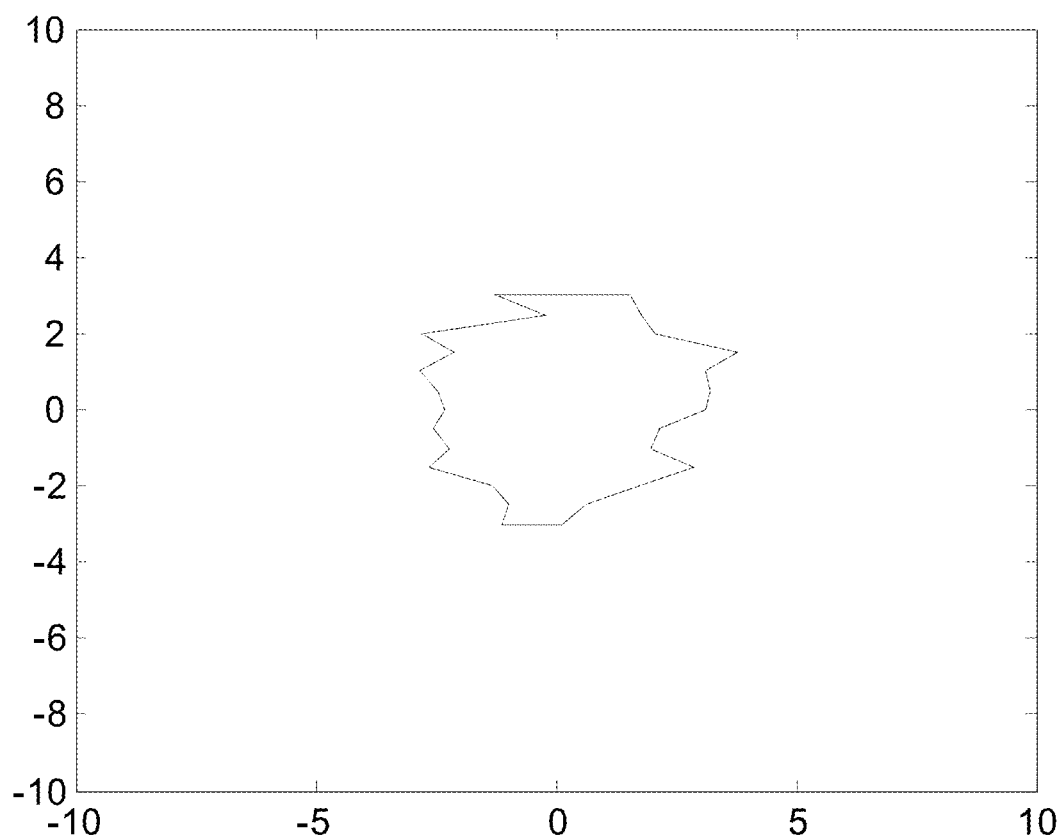
FIG. 7 is a density distribution contour of a half-peak plane of the three-dimensional probability density plot, that is, the reconstructed radioactive source contour corresponding to the i-th spatial layer.

In some preferred embodiments, the specific process of the step (4) is as follows: obtaining the peak $w_{max}$ from the three-dimensional probability density plot and the half peak $w_{max/2}$, making a plane parallel to the XOY plane through the half-peak $w_{max/2}$, the parallel intersecting the three-dimensional probability density plot to obtain a contour $L_{XY}$, as shown in FIGS. 6 and 7; and this relationship is expressed as follows:

$$L_{XY} = \begin{cases} SLC(X, Y) = G(X, Y, Z) \\ W_{max/2} = 1/2 \max(G(X, Y, Z) \to Z) \end{cases}$$

Where, SLC(X,Y) represents the slice plane at the peak point, that is, making a plane parallel to the XOY plane through the peak point; G(X,Y,Z) represents the three-dimensional probability density plot, and $W_{max/2}$ represents the half-height probability density plane.

Surface fitting is performed on the three-dimensional probability density plot, and the density function g(x,y) is obtained through surface fitting, and based on the density function g(x,y), the following accuracy evaluation value can be obtained:

$$R_{XY} = \sqrt{\oint_{L_{XY}} g(x, y) dx dy / \pi},$$

where, $R_{XY}$ represents the accuracy description on the equivalent recognition unidirectional plane. By applying this calculation method, the accuracy descriptions of $R_{XZ}$ and $R_{YZ}$ can be obtained; in this embodiment, $R_{XY}$ represents the accuracy description on the plane where the equivalent recognition contour $L_{XY}$ is located.

Apparently, the described embodiments are only a part rather than all of embodiments of the present invention. Based on the embodiments of the present invention, all other embodiments obtained by a person of ordinary skill in the art without creative work shall fall within the scope of protection of the present invention.

What is claimed is:

1. A three-dimensional reconstruction method based on half-peak probability density distribution, comprising the following steps:

(1) slicing three-dimensional point cloud along a Z-axis direction to obtain a N spatial layers;

(2) extracting a scatter information in an i-th spatial layer and projecting the information to a $Z_i$ plane;

(3) constructing a membership function of each grid and scatter in the $Z_i$ plane and drawing a three-dimensional probability density plot;

(4) making a plane parallel to a XOY plane through a half-peak $w_{max/2}$ of the three-dimensional probability density plot, the parallel intersecting the three-dimensional probability density plot to obtain a contour $L_{XY}$, and the contour $L_{XY}$ being a radioactive source reconstruction contour corresponding to the i-th spatial layer; and, (5) superimposing radioactive source reconstruction contours corresponding to N spatial layers sequentially to obtain a three-dimensional reconstruction model of the radioactive source.

2. The three-dimensional reconstruction method based on half-peak probability density distribution according to claim 1, wherein a specific process of step (1) is: performing three-dimensional voxel segmentation modeling in an imaging area, defining a search space as a space rectangular coordinate system, and conducting statistics of a maximum value Zmax and minimum value Zmin on Z-axis coordinates of a point cloud data, letting, $$N = [n] + 1, n = \frac{Zmax - Zmin}{m1}$$

where [ ] is a rounding function, m1 is a thickness of each spatial layer, and N is a number of spatial layer layers after the space is cut; and, taking m1 as the thickness of each spatial layer, the three-dimensional point cloud is divided in a plane parallel to XOY along the Z-axis direction, to obtain N spatial layers, and the plane dividing the three-dimensional point cloud along the Z-axis direction is defined as $Z_1, Z_2 \ldots Z_{N+1}$.

3. The three-dimensional reconstruction method based on half-peak probability density distribution according to claim 1, wherein a specific process of step (2) is: judging a three-dimensional point cloud data and assigning values, and setting a coordinate of any point P in the point cloud as $(x_p, y_p, z_p)$, and $z_p$ satisfying:

$$z_i \leq z_p < z_{i+1}$$

it can be known that the P point is in the i-th spatial layer, that is, a space between $Z_i$ and $Z_{i+1}$ planes, including $Z_i$ plane, but excluding $Z_{i+1}$ plane;

projecting the P point from the space to a lower plane where the space is located, that is, the $Z_i$ plane, letting, $$z_p = z_i,$$

then the coordinate $(x_p, y_p, z_p)$ of point P is transformed into $P'(x_p, y_p, z_i)$; all coordinates of the point cloud data are traversed, and all point cloud data are projected onto a corresponding plane in sequence.

4. The three-dimensional reconstruction method based on half-peak probability density distribution according to claim 1, wherein a specific process of step (3) is: taking the projection plane $Z_i$, simplifying a coordinate $P'(x_p, y_p, z_i)$ of all projection points in the $Z_i$ plane to plane coordinate $P''(x_p, y_p)$, conducting statistics of a maximum value $X_{max}$ and a minimum value $X_{min}$ on a X-axis coordinates, and a maximum value $Y_{max}$ and a minimum value $Y_{min}$ on a Y-axis coordinates; letting, $$E = [e] + 1, e = \frac{X max - X min}{m2},$$

$$F = [f] + 1, f = \frac{Y max - Y min}{m2},$$

where, [ ] is a rounding function, m2 is a grid step size, E is a number of columns of a $Z_i$ plane data divided equally in a X axis direction, and F is a number of rows of a $Z_i$ plane data divided equally in a Y axis direction; and, at this time, the $Z_i$ plane is divided into E*F grids with a side length of m2; the plane data are mapped into a two-dimensional matrix of F*E, and a initial values of matrix elements $a_{11}, a_{12} \ldots a_{jk} \ldots a_{FE}$ are all zero, if a point cloud data coordinate is:

$$\begin{cases} x_j \leq x_p < x_{j+1}, \\ y_k \leq y_p < y_{k+1} \end{cases},$$

then $a_{jk}=a_{jk}+1$, and, all points in the $Z_i$ plane are traversed to obtain the matrix $A_{FE}$, a matrix element value expresses a membership relationship between the point cloud data and its position, statistical reconstruction of the three-dimensional probability density distribution is performed for aggregation and distribution of points on the Zi plane to obtain a three-dimensional intensity plot, that is, a three-dimensional probability density plot.

5. The three-dimensional reconstruction method based on half-peak probability density distribution according to claim 1, wherein a specific process of step (4) is: obtaining a peak $w_{max}$ from the three-dimensional probability density plot and the half peak $w_{max/2}$, making a plane parallel to the XOY plane through the half-peak $w_{max/2}$, the parallel intersecting the three-dimensional probability density plot to obtain a contour $L_{XY}$, and expressing this relationship as follows:

$$L_{XY} = \begin{cases} SLC(X, Y) = G(X, Y, Z) \\ W_{max/2} = 1/2\max(G(X, Y, Z) \rightarrow Z) \end{cases}$$

where, SLC(X,Y) represents a slice plane at a peak point, G(X,Y,Z) represents the three-dimensional probability density plot, and $W_{max/2}$ represents a half-height probability density plane.

* * * * *